3,321,396
PURIFICATION OF NORMAL HYDROCARBONS
BY ADSORPTION
Stanley Raymond Collins Dryer, Feltham, John Edward Adams, Wokingham, and John Neil Turnbull, Twickenham, England, assignors to The British Petroleum Company Limited, London, England, a corporation of England
No Drawing. Filed Aug. 5, 1964, Ser. No. 388,982
Claims priority, application Great Britain, Aug. 16, 1963, 32,461/63
8 Claims. (Cl. 208—310)

This invention relates to the treatment of n-paraffin fractions and particularly to n-paraffin fractions obtained by the molecular sieve extraction of petroleum feedstocks.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It has previously been proposed to treat petroleum fractions ranging from gasoline to gas-oils and higher with molecular sieves having pore diameters ranging from 4 A. to 15 A. In order to separate straight chain hydrocarbons from branched chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight chain material may also be recovered as a product.

One important use for n-paraffins is as feedstocks for the preparation of the class of compounds known as "mesamolls." Mesamolls may be broadly defined as esters having the general formula R'SO$_2$OR" where R' is a saturated open chain hydrocarbon radical and R" is an aromatic or aliphatic radical. R' preferably contains 9–20 carbon atoms per molecule and n-paraffins in the $C_9$–$C_{20}$ range are particularly suitable feedstocks from which to prepare mesamolls, especially n-paraffins in this range obtained by the molecular sieve extraction of petroleum fractions. Mesamolls are useful as plasticizers and it is important that the mesamoll should be as free from impurities as possible.

It has been found that the presence of even small quantities of aromatics as impurity in the n-paraffin feedstock can have serious effects on the colour of the resulting mesamoll. It is therefore desirable to reduce the aromatic content of the n-paraffin feedstock to as low a value as possible before preparing the mesamolls. The maximum toleration of aromatics cannot be stated with certainty since this value is below that to which current analytical techniques for measuring aromatic content can be accurately applied. It is believed, however, that the aromatic content should be reduced to below 0.01%. In practice a convenient method of assessing the stability of an n-paraffin fraction is to prepare from it a sample of a mesamoll in known manner and to measure the colour of the mesamoll on a Lovibond tintometer. A colour of less than 2.0Y in a 2" cell is considered satisfactory. Other potential uses for n-paraffins require a low aromatic content, for example as an oxidation feedstock where aromatics can act as powerful inhibitors of the process. By careful control of the molecular sieve extraction process, n-paraffin fractions of greater than 95% weight purity can be obtained but these fractions still contain aromatics in an amount up to at least 2.5% weight. Some further treatment is therefore required in order to obtain n-paraffins suitable for mesamoll production.

According to the present invention a process for the preparation of n-paraffin fractions from petroleum fractions comprises subjecting the petroleum fraction to extraction with a 5 A. molecular sieve to separate an n-paraffinic fraction, treating the n-paraffinic fraction with silica gel to adsorb aromatic hydrocarbons, displacing n-paraffins held up in the silica gel using liquid pentane at ambient temperature, desorbing aromatics from the silica gel using butane or pentane at elevated temperature in either the liquid or vapour phase, and reusing the silica gel to treat more n-paraffinic material.

By contacting the silica gel with butane or pentane at ambient temperature before the desorption step proper, any non-aromatic material held up in the silica gel may be removed from the system and passed with the dearomatised n-paraffin stream to enhance the yield of n-paraffins. In addition, this intermediate step avoids any re-contamination of n-paraffins with aromatics which might result if no such step was employed.

The desorption step may take place in either the vapour phase or liquid phase. Suitable vapour phase conditions include a temperature within the range 50–400° C., a pressure within the range atmospheric-1000 p.s.i.g., and a liquid space velocity within the range 0.1–5 v./v./hr. Suitable liquid phase conditions include a temperature within the range 15–250° C., a pressure within the range atmospheric-1000 p.s.i.g., and a space velocity within the range 0.1–5 v./v./hr.

The silica gel treatment is preferably carried out in a fixed bed. Preferably, in order to allow fully cyclic operation, at least two beds of silica gel are provided so that while one bed is being desorbed, another may be adsorbing.

The process of the present invention is particularly suitable for the production of n-paraffins for mesamoll preparation. Preferably the n-paraffinic fraction obtained from the molecular sieve extraction contains at least 95% of n-paraffins. A suitable molecular sieve extraction process which is capable of giving a 95% pure n-paraffin fraction comprises a three stage, isothermal, vapour phase process in which a petroleum feedstock is contacted with a 5 A. molecular sieve in a first stage to absorb straight chain hydrocarbons, the sieve is contacted with a purging medium in a second stage to remove material adsorbed on the surface of the sieve or held interstitially between sieve particles, and the absorbed straight chain hydrocarbons are desorbed in a third stage using n-pentane or n-butane as desorbing medium, the pressure in the desorption stage being equal to, or greater than, the pressure in the adsorption stage.

Such a process for treating $C_{10}$–$C_{20}$ petroleum fractions is described, for example, in our co-pending application Ser. No. 168,981, filed Jan. 26, 1962, now U.S. Patent No. 3,201,490. Preferably, the petroleum fraction prior to molecular sieve extraction is subjected to a hydrocatalytic desulphurisation step to reduce the sulphur content, preferably to a value between 0.002 and 0.015% weight. Suitable petroleum feedstocks for the process of the present invention lie within the range $C_9$ and above, particularly $C_9$–$C_{20}$.

An important feature of the present invention is that desorption of the silica gel may be achieved using the same desorbent as that employed to desorb the molecular sieve. The use of pentane is particularly preferred. This mode of operation enables the overall process of molecular sieve extraction and silica gel treatment to be operated much more economically than if a different desorbing medium was used to desorb the silica gel, thereby necessitating the provision of additional storage and recovery equipment.

If desired a final polishing treatment may be given to the silica gel treated product to clear up any trace impurities remaining. Such a treatment may comprise, for example, a bauxite treatment or a redistillation step.

The invention is illustrated by the following example:

*Example*

A n-paraffinic fraction was obtained by the molecular sieve extraction of a petroleum fraction boiling within the range 200–300° C. in a three stage adsorption-purge-desorption process carried out under the conditions indicated in the following Table 1:

TABLE 1

| Stage | Feed | Temp., °C. | Press., p.s.i.g. | Period, mins. |
|---|---|---|---|---|
| Absorption | {Oil, Nitrogen} | 380 | 120 | 6 |
| Purge | Nitrogen | 380 | 120 | 6 |
| Desorption | n-Pentane | 380 | 120 | 12 |

A n-paraffinic product boiling within the range 200–300° C. and containing 1.2% weight of aromatic hydrocarbons was obtained. This product was passed over a bed of silica gel for 4 hours at a space velocity of 0.64 w./w./hr., at ambient temperature (20° C.), and a pressure of 100 p.s.i.g. Liquid pentane was then passed at ambient temperature (20° C.) over the silica gel at a space velocity of 0.52 v./v./hr. for 4 hours. The silica gel was finally desorbed for 8 hours at a space velocity of 0.52 v./v./hr. using hot pentane in the liquid and vapour phase at various temperatures and pressures. The results are given in the following Table 2:

pentane at ambient temperature, desorbing aromatics from the silica gel using butane or pentane at elevated temperature in either the liquid or vapour phase, and re-using the silica gel to treat more n-paraffinic material.

2. A process as claimed in claim 1 wherein the aromatics are desorbed from the silica gel in the vapour phase at a temperature within the range 40–400° C., a pressure within the range atmospheric-1000 p.s.i.g., and a liquid space velocity within the range 0.1–5 v./v./hr.

3. A process as claimed in claim 1 wherein the aromatics are desorbed from the silica gel in the liquid phase at a temperature within the range 15–250° C., a pressure within the range atmospheric-1000 p.s.i.g., and a space velocity within the range 0.1–5 v./v./hr.

4. A process as claimed in claim 1 wherein the silica gel treatment is carried out in at least one fixed bed.

5. A process as claimed in claim 1 wherein the molecular sieve extraction is conducted so as to yield a n-paraffinic fraction containing at least 95% by weight of n-paraffins.

6. A process as claimed in claim 1 wherein the petroleum feedstock boils within the range $C_9$ to $C_{20}$.

7. A process as claimed in claim 1 wherein the desorption of the silica gel is achieved using the same desorbent as that employed to desorb the molecular sieve during the molecular sieve extraction stage, this desorbent preferably being n-pentane.

8. A process as claimed in claim 1 wherein the silica gel treated product is given a final polishing treatment to remove any trace impurities.

TABLE 2

| Conditions of Desorption | Recoveries percent wt. (pentane free) Feedstock | | Aromatics Recovery | | |
|---|---|---|---|---|---|
| | Total Recovery of oil | Bulk Recovery of N-paraffins of Mesamoll standard | Wt. of Aromatics, fed. lbs. | Wt. of Aromatics recovered in desorption pentane (by I.R. or U.V. analysis), lbs. | Wt. of Aromatics recovered in percentage of maximum possible recovery |
| Vapour phase pentane at 500° F. and atmospheric pressure | 98.5 | 94.5 | 1.70 | 1.40 | 82.4 |
| Vapour phase pentane at 700° F. and atmospheric pressure | | 97.4 | 1.59 | 1.40 | 88.1 |
| Liquid phase pentane at 200–220° F. and 115 p.s.i.g. pressure | 96.0 | 96.0 | 1.72 | 1.60 | 93.02 |

It is seen that a good recovery of n-paraffins of mesamoll standard was obtained.

We claim:

1. A process for the preparation of n-paraffin fractions from petroleum fractions comprising subjecting the petroleum fractions to extraction with a 5 A. molecular sieve to separate a n-paraffinic fraction, treating the n-paraffinic fraction with silica gel to adsorb aromatic hydrocarbons, displacing n-paraffins held up in the silica gel using liquid

References Cited by the Examiner

UNITED STATES PATENTS

| 2,632,778 | 3/1953 | Jonach | 208—310 |
| 2,773,803 | 12/1956 | Van der Fear et al. | 208—310 |
| 2,916,446 | 12/1959 | Shuman | 208—310 |
| 3,216,928 | 11/1965 | Paulson | 208—310 |

DELBERT E. GANTZ, *Primary Examiner.*

A. D. SULLIVAN, *Assistant Examiner.*